(12) United States Patent
Kelly

(10) Patent No.: US 7,269,709 B2
(45) Date of Patent: Sep. 11, 2007

(54) MEMORY CONTROLLER CONFIGURABLE TO ALLOW BANDWIDTH/LATENCY TRADEOFF

(75) Inventor: James Daniel Kelly, Scotts Valley, CA (US)

(73) Assignee: Broadcom Corporation, Irvine, CA (US)

( * ) Notice: Subject to any disclaimer, the term of this patent is extended or adjusted under 35 U.S.C. 154(b) by 368 days.

(21) Appl. No.: 10/269,913

(22) Filed: Oct. 11, 2002

(65) Prior Publication Data

US 2003/0217244 A1 Nov. 20, 2003

Related U.S. Application Data

(60) Provisional application No. 60/380,740, filed on May 15, 2002.

(51) Int. Cl.
*G06F 12/00* (2006.01)
(52) U.S. Cl. .................. 711/211; 711/168
(58) Field of Classification Search ......... 711/211, 711/5, 119, 120, 127, 157, 168; 710/38
See application file for complete search history.

(56) References Cited

U.S. PATENT DOCUMENTS

| | | | |
|---|---|---|---|
| 5,448,715 A | 9/1995 | Lelm et al. | |
| 5,721,839 A | 2/1998 | Callison et al. | |
| 6,076,139 A * | 6/2000 | Welker et al. | 711/104 |
| 6,101,568 A | 8/2000 | Richardson | |
| 6,205,506 B1 | 3/2001 | Richardson | |
| 6,304,947 B1 * | 10/2001 | Killig et al. | 711/154 |
| 6,321,303 B1 | 11/2001 | Hoy et al. | |
| 6,449,701 B1 | 9/2002 | Cho | |
| 6,470,409 B1 * | 10/2002 | Ridgeway | 710/305 |
| 6,625,685 B1 * | 9/2003 | Cho et al. | 711/5 |
| 6,738,881 B1 * | 5/2004 | Ollivier et al. | 711/168 |
| 6,766,385 B2 * | 7/2004 | Dodd et al. | 710/35 |

OTHER PUBLICATIONS

Halfhill, "SiByte Reveals 64-bit Core for NPUs," Microprocessor Report, Jun. 2000, pp. 45-48.
*82420 PCIset Cache/Memory Subsystem*, © 1993 Intel Corporation, pp. 23-149
*82430 PCIset Cache/Memory Subsystem*, © 1993 Intel Corporation, pp. 53-168.
*Digital Semiconductor 21172, Core Logic Chipset, Technical Reference Manual*, © Digital Equipment Corporation, Apr. 1996, Ch. 3 pp. 17-27; Ch. 4 pp. 49-61.

* cited by examiner

*Primary Examiner*—Donald Sparks
*Assistant Examiner*—Jesse Diller
(74) *Attorney, Agent, or Firm*—Garlick Harrison & Markison

(57) ABSTRACT

A memory controller includes a plurality of channel control circuits. Each of the plurality of channel control circuits is coupled to a respective one of a plurality of channels which are coupled to a memory system. The plurality of channel control circuits are coupled to receive an indication of whether or not the plurality of channels are ganged. Data is transferred for a first command on each of the plurality of channels responsive to the indication indicating that the plurality of channels are ganged. Responsive to the indication indicating that the plurality of channels are not ganged, data is transferred for the first command on a selected channel of the plurality of channels. In some embodiments, the memory controller may be integrated with one or more processors.

12 Claims, 9 Drawing Sheets

MEMORY CONTROLLER CONFIGURABLE TO ALLOW BANDWIDTH/LATENCY TRADEOFF

This application claims benefit of priority to U.S. Provisional Patent Application Ser. No. 60/380,740, filed May 15, 2002.

BACKGROUND OF THE INVENTION

1. Field of the Invention

This invention is related to the field of memory controllers.

2. Description of the Related Art

Memory controllers are designed to interface to various types of memory, on behalf of one or more requesters (e.g. processors, peripheral devices, etc.). Typically, the memory controller is designed to provide certain latency and bandwidth characteristics. In general, it is desirable to provide low latency and high bandwidth access to memory. However, it is frequently the case that optimizations made to reduce latency may reduce the bandwidth. Similarly, it is frequently the case that optimizations made to increase the bandwidth lead to increased latency. Thus, the designer must often make choices between low latency features and high bandwidth features in designing a memory controller.

The latency and bandwidth characteristics of a given memory controller may be selected, e.g., based on the expected workload of the memory controller. For example, memory controllers may often be optimized for processor accesses, in which latency is often the key characteristic. Other types of workloads may favor bandwidth over latency. For example, in networking environments, large numbers of packets may be written to and read from memory. While low latency for such accesses is desirable, having high bandwidth may be more important to ensure that the packets can be written to and read from memory without having to drop packets, or without slowing down the network packet traffic with flow control.

A memory controller that may be used in implementations for which low latency is more important (e.g. processor workloads) and in implementations for which high bandwidth is more important (e.g. packet processing workloads) presents challenges to the designer when selecting the appropriate bandwidth and latency characteristics, especially if the features implemented to improve one characteristic may cause degradation in the other characteristic. Similarly, memory controller implementations which may have large workloads of both types present such challenges.

SUMMARY OF THE INVENTION

In one embodiment, a memory controller includes a plurality of channel control circuits. Each of the plurality of channel control circuits is coupled to a respective one of a plurality of channels which are coupled to a memory system. The plurality of channel control circuits are coupled to receive an indication of whether or not the plurality of channels are ganged. Data is transferred for a first command on each of the plurality of channels responsive to the indication indicating that the plurality of channels are ganged. Responsive to the indication indicating that the plurality of channels are not ganged, data is transferred for the first command on a selected channel of the plurality of channels.

In one implementation, a system includes one or more processors and a memory controller coupled to receive memory transactions from the processors. The memory controller is configured to process a command in response to each memory transaction, and is coupled to a plurality of channels. The plurality of channels are coupled to a memory system. The memory controller is configured to transfer data for a first command on each of the plurality of channels responsive to an indication indicating that the plurality of channels are ganged. On the other hand, the memory controller is configured to transfer data on a selected one of the plurality of channels responsive to the indication indicating that the plurality of channels are not ganged.

A method is contemplated. An indication is generated of whether or not a plurality of channels from a memory controller to a memory system are ganged. Data is transferred for a first command on each of the plurality of channels responsive to the indication indicating that the plurality of channels are ganged. Data is transferred for the first command on a selected one of the plurality of channels responsive to the indication indicating that the plurality of channels are not ganged.

BRIEF DESCRIPTION OF THE DRAWINGS

The following detailed description makes reference to the accompanying drawings, which are now briefly described.

Figure 1:
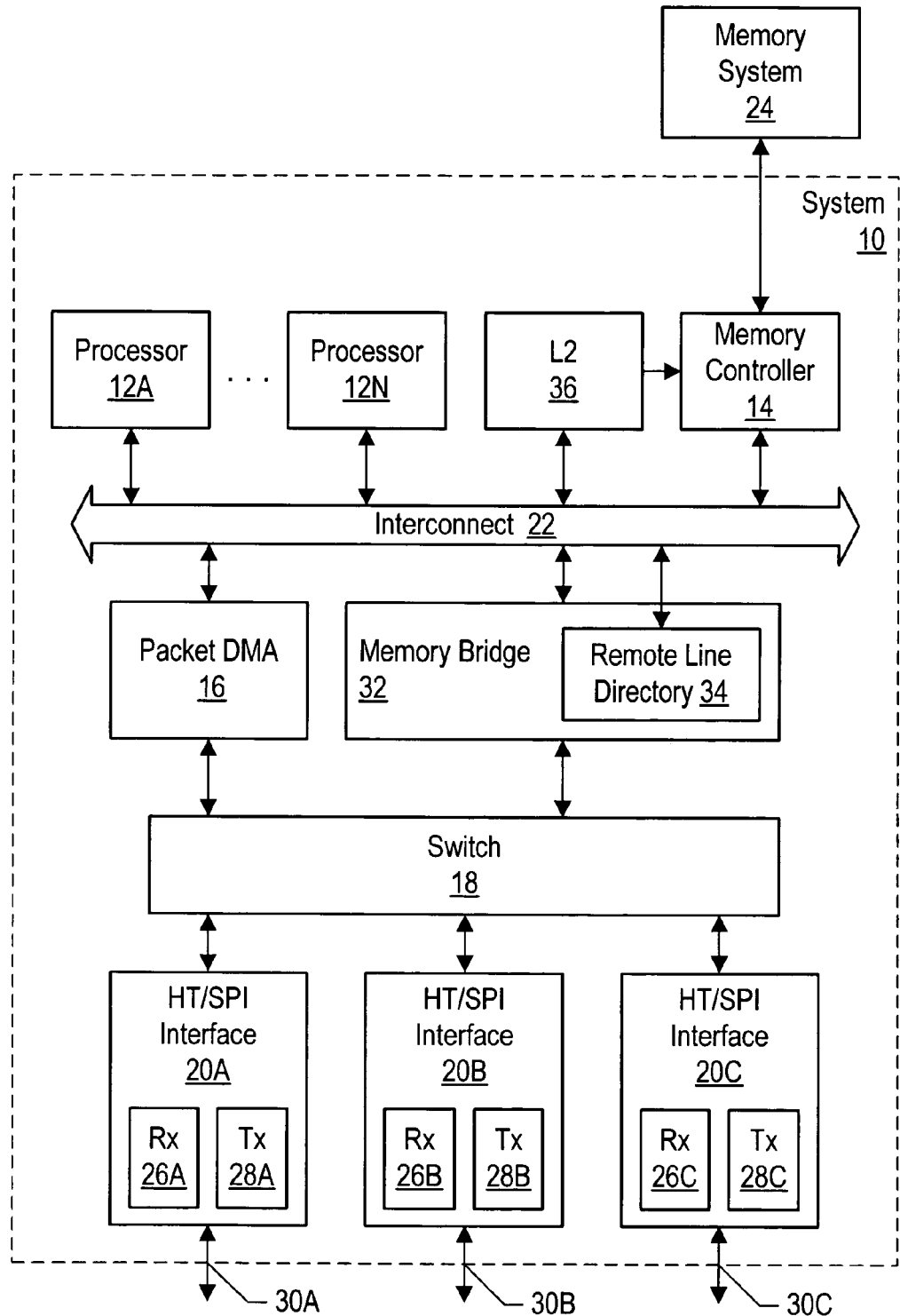
FIG. 1 is a block diagram of one embodiment of a system including one embodiment of a memory controller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

System Overview

Turning now to FIG. 1, a block diagram of one embodiment of a system 10 is shown. In the embodiment of FIG. 1, the system 10 includes one or more processors 12A-12N, a memory controller 14, a switch 18, a set of interface circuits 20A-20C, a memory bridge 32, a packet direct memory access (DMA) circuit 16, and an L2 cache 36. The memory bridge 32 includes a remote line directory 34. The system 10 includes an interconnect 22 to which the processors 12A-12N, the memory controller 14, the L2 cache 36, the memory bridge 32, the packet DMA circuit 16, and the remote line directory 34 are coupled. The system 10 is coupled, through the memory controller 14, to a memory system 24. The interface circuits 20A-20C each include a receive (Rx) circuit 26A-26C and a transmit (Tx) circuit 28A-28C. The system 10 is coupled to a set of interfaces 30A-30C through respective interface circuits 20A-20C. The interface circuits 20A-20C are coupled to the switch 18, which is further coupled to the memory bridge 32 and the packet DMA circuit 16.

Generally, the various agents coupled to the interconnect 22 (e.g. the processors 12A-12N, the L2 cache 36, the packet DMA circuit 16, and the memory bridge 32 in the illustrated embodiment, as well as any peripheral bridges or peripheral interfaces, not shown in FIG. 1) may generate transactions on the interconnect 22 to access the memory system 24. The memory controller 14 may receive the transactions, and decode each transaction into a command to access the memory system 24. The memory controller 14 may implement multiple channels to the memory system 24. The memory controller 14 may be configured to gang channels together, and may transfer data to/from the memory system 24 for a command using the ganged combination of channels. With the channels ganged together, more data may be transferred per unit time, and thus the latency to transfer all of the data requested by the command may be relatively low. On the other hand, the memory controller 14 may be configured to operate the channels independently. The independent channels may be used to transfer data for multiple commands concurrently. While each command may be higher latency than if the channels were ganged together, bandwidth utilization may be higher in some embodiments, and thus effective bandwidth may be increased.

By providing a memory controller 14 that is configurable to gang the channels or to operate them independently, the bandwidth and latency characteristics of the memory controller 14 may be selected to meet the workload requirements existing in a given instantiation of the system 10. For example, in one embodiment, the system 10 may be integrated onto a single integrated circuit as a system on a chip configuration. The system on a chip may be implemented in various types of larger systems (e.g. packet processing systems; network systems such as routers, gateways, etc.; storage systems; etc.) which may present various types of workloads for the memory controller 14. Dependent on the larger system in which the system 10 is instantiated, different bandwidth and latency characteristics may be configured.

In one embodiment, the memory controller 14 may provide multiple sets of channels that may be ganged together as a set or that may be operated independently. Each set may be independently configurable as ganged or not ganged. Such embodiments may provide further flexibility in configuring the memory controller 14. That is, certain portions of the memory address space (the portions coupled to ganged channels) may exhibit low latency characteristics while other portions of the memory address space (the portions coupled to non-ganged channels) may exhibit high bandwidth characteristics.

The system 10 may be configurable as a node in a multinode coherent system. In such a coherent system, internode coherency may be maintained via coherency commands transmitted to the system 10 and by the system 10 on one or more of the interfaces 30A-30C (via the interface circuits 20A-20C, respectively). Intranode coherency may be maintained by the agents coupled to the interconnect 22. The memory bridge 32 may be responsible for handling internode coherency functions within the system 10. As used herein, a memory bridge includes circuitry designed to handle internode coherency functions within a node. In response to at least some received coherency commands, the memory bridge 32 may generate corresponding transactions on the interconnect 22. In response to at least some transactions on the interconnect 22 generated by other agents, the memory bridge 32 may generate coherency commands. The memory bridge 32 may also handle transmission and processing of noncoherent commands, in one embodiment.

In one embodiment, the internode coherency scheme implemented by the memory bridge 32 may be a cache coherent nonuniform memory access (CC-NUMA) scheme using extensions to the HyperTransport™ interface. Other embodiments may employ any internode coherency scheme. The remote line directory 34 may be implemented to track the state, in other nodes, of blocks belonging to the memory system 24. In one embodiment, the remote line directory 34 may be a cache which stores a subset of the remotely-shareable blocks. If blocks are evicted from the remote line directory 34, the memory bridge 32 may generate coherency commands to other nodes to invalidate any copies of the evicted block that may be stored in those other nodes.

The packet DMA circuit 16 may handle the storing and retrieval of packets to the memory system 24, on behalf of the interface circuits 20A-20C. As used herein, a packet DMA circuit comprises circuitry to communicate packets to and from a memory. The packet DMA circuit 16 may generate write transactions on the interconnect 22 to the memory controller 14 to write received packets to the memory system 24, and may generate read transactions on the interconnect 22 to read packets from the memory system 24 for transmission by one of the interface circuits 20A-20C. In some embodiments, the packet DMA circuit 16 may use descriptors to locate the memory locations to which the packets are to be read/written. In such embodiments, the packet DMA circuit 16 may also generate read and write transactions to read and write the descriptors in memory.

The switch 18 may separate coherent traffic and packet traffic from the interface circuits 20A-20C, routing the coherent traffic to the memory bridge 32 and routing the packet traffic to the packet DMA circuit 16. In one embodiment, the switch 18 may generally select sources and destinations to be coupled for communication based on requests from the sources to transmit data and requests from the destinations for data. For example, the interface circuits 20A-20C (particularly the Rx circuits 26A-26C) may identify coherency commands and packets received on the interfaces 30A-30C, and may request transfer to the packet DMA circuit 16 (for packets) and the memory bridge 32 (for coherency commands). If the packet DMA circuit 16 or memory bridge 32 has indicated the ability to receive data of the corresponding type, the switch 18 may grant a transfer between a requesting Rx circuit 26A-26C and the packet DMA circuit 16 or the memory bridge 32. Similarly, the packet DMA circuit 16 or memory bridge 32 may request a transfer to an interface circuit 20A-20C (particularly, to a Tx circuit 28A-28C). If the Tx circuit 28A-28C has indicated the ability to receive data of the corresponding type, the switch 18 may grant a transfer between the requesting packet DMA circuit 16/memory bridge 32 and the Tx circuit 28A-28C.

In one embodiment, the interfaces 30A-30C may support a set of virtual channels in which coherency commands, noncoherent commands, and packets are transmitted. Each virtual channel is defined to flow independent of the other virtual channels, even though the virtual channels may share certain physical resources (e.g. the interface 30A-30C on which the commands are flowing). These virtual channels may be mapped to internal virtual channels (referred to as switch virtual channels herein). The switch 18 may be virtual-channel aware. That is, the switch 18 may grant a coupling between a source and a destination based not only on the ability of the source to transfer data and the destination to receive data, but also on the ability-of the source to transfer data in a particular switch virtual channel and the destination to receive data on that switch virtual channel. Thus, requests from sources may indicate the destination and the virtual channel on which data is to be transferred, and requests from destinations may indicate the virtual channel on which data may be received. The switch virtual channels may identify a destination and a virtual channel at that destination, and they may be referred to as the destination and virtual channel, or collectively as the switch virtual channel, herein.

Additionally, in some embodiments, the switch 18 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary. A similar boundary condition may be used for coherency commands, if more than one transfer through the switch 18 is used to transfer coherency commands.

Each of the interfaces 30A-30C used for coherent communications are defined to be capable of transmitting and receiving coherency commands. Particularly, in the embodiment of FIG. 1, those interfaces 30A-30C may be defined to receive/transmit coherency commands to and from the system 10 from other nodes. Additionally, other types of commands may be carried. In one embodiment, each interface 30A-30C that is used to carry coherency commands may be a HyperTransport™ (HT) interface, including an extension to the HT interface to include coherency commands (HTcc). Additionally, in some embodiments, an extension to the HyperTransport interface to carry packet data (Packet over HyperTransport, or PoHT) may be supported. As used herein, coherency commands include any communications between nodes that are used to maintain coherency between nodes. The commands may include read or write requests initiated by a node to fetch or update a cache block belonging to another node, probes to invalidate cached copies of cache blocks in remote nodes (and possibly to return a modified copy of the cache block to the home node), responses to probe commands, fills which transfer data, etc. A noncoherent command is a communication between devices that does not necessarily occur coherently. For example, standard HT commands may be noncoherent commands. The interface circuits 20A-20C coupled to interfaces 30A-30C may transmit/receive the coherency commands and non-coherent commands.

In some embodiments, one or more of the interfaces 30A-30C may not be used for coherency management and may be defined as packet interfaces. Those interfaces 30A-30C may be HT interfaces using the PoHT extension. Alternatively, such interfaces 30A-30C may be system packet interfaces (SPI) according to any level of the SPI specification set forth by the Optical Internetworking Forum (e.g. level 3, level 4, or level 5). In one particular embodiment, the interfaces may be SPI-4 phase 2 interfaces. In the illustrated embodiment, each interface circuit 20A-20C may be configurable to communicate on either the SPI-4 interface or the HT interface. Each interface circuit 20A-20C may be individually programmable, permitting various combinations of the HT and SPI-4 interfaces as interfaces 30A-30C. The programming may be performed in any fashion (e.g. sampling certain signals during reset, shifting values into configuration registers (not shown) during reset, programming the interfaces with configuration space commands after reset, pins that are tied up or down externally to indicate the desired programming, etc.). Other embodiments may employ any interface capable of carrying packet data (e.g. the Media Independent Interface (MII) or the Gigabit MII (GMII) interfaces, X.25, Frame Relay, Asynchronous Transfer Mode (ATM), etc.). The packet interfaces may carry packet data directly (e.g. transmitting the packet data with various control information indicating the start of packet, end of packet, etc.) or indirectly (e.g. transmitting the packet data as a payload of a command, such as PoHT). The SPI-4 interface may define 16 hardware virtual channels, extendable to 256 virtual channels in software. As used herein, an interface circuit includes any circuitry configured to communicate on an interface according to the protocol defined for the interface. The interface circuit may include receive circuitry configured to receive communications on the interface and transmit the received communications to other circuitry internal to the system that includes the interface circuit. The interface circuit may also include transmit circuitry configured to receive communications from the other circuitry internal to the system and configured to transmit the communications on the interface.

The processors 12A-12N may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 10 may include any number of processors (e.g. as few as one processor, two processors, four processors, etc.).

The L2 cache 36 may be any type and capacity of cache memory, employing any organization (e.g. set associative, direct mapped, fully associative, etc.). In one embodiment, the L2 cache 36 may be an 8 way, set associative, 1 MB cache. The L2 cache 36 is referred to as L2 herein because the processors 12A-12N may include internal (L1) caches. In other embodiments the L2 cache 36 may be an L1 cache, an L3 cache, or any other level as desired.

The memory controller 14 is configured to access the memory system 24 in response to read and write transactions received on the interconnect 22. The memory controller 14 may receive a hit signal from the L2 cache, and if a hit is detected in the L2 cache for a given read/write transaction, the memory controller 14 may not respond to that transaction. The memory controller 14 may be designed to access any of a variety of types of memory. For example, the memory controller 14 may be designed for synchronous dynamic random access memory (SDRAM), and more particularly double data rate (DDR) SDRAM. Alternatively, the memory controller 16 may be designed for DRAM, reduced latency DRAM (RLDRAM), DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The interconnect 22 may be any form of communication medium between the devices coupled to the interconnect. For example, in various embodiments, the interconnect 22 may include shared buses, crossbar connections, point-to-point connections in a ring, star, or any other topology, meshes, cubes, etc. The interconnect 22 may also include storage, in some embodiments. In one particular embodiment, the interconnect 22 may comprise a bus. The bus may be a split transaction bus, in one embodiment (i.e. having separate address and data phases). The data phases of various transactions on the bus may proceed out of order with the address phases. The bus may also support coherency and thus may include a response phase to transmit coherency response information. The bus may employ a distributed arbitration scheme, in one embodiment. In one embodiment, the bus may be pipelined. The bus may employ any suitable signaling technique. For example, in one embodiment, differential signaling may be used for high speed signal transmission. Other embodiments may employ any other signaling technique (e.g. TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired.

Various embodiments of the system 10 may include additional circuitry, not shown in FIG. 1. For example, the system 10 may include various I/O devices and/or interfaces. Exemplary I/O may include one or more PCI interfaces, one or more serial interfaces, Personal Computer Memory Card International Association (PCMCIA) interfaces, etc. Such interfaces may be directly coupled to the interconnect 22 or may be coupled through one or more I/O bridge circuits.

In one embodiment, the system 10 (and more particularly the processors 12A-12N, the memory controller 14, the L2 cache 36, the interface circuits 20A-20C, the memory bridge 32 including the remote line directory 34, the packet DMA circuit 16, the switch 18, and the interconnect 22) may be integrated onto a single integrated circuit as a system on a chip configuration. The additional circuitry mentioned above may also be integrated. Alternatively, other embodiments may implement one or more of the devices as separate integrated circuits. In another configuration, the memory system 24 may be integrated as well. Alternatively, one or more of the components may be implemented as separate integrated circuits, or all components may be separate integrated circuits, as desired. Any level of integration may be used.

Memory Controller

Figure 2:
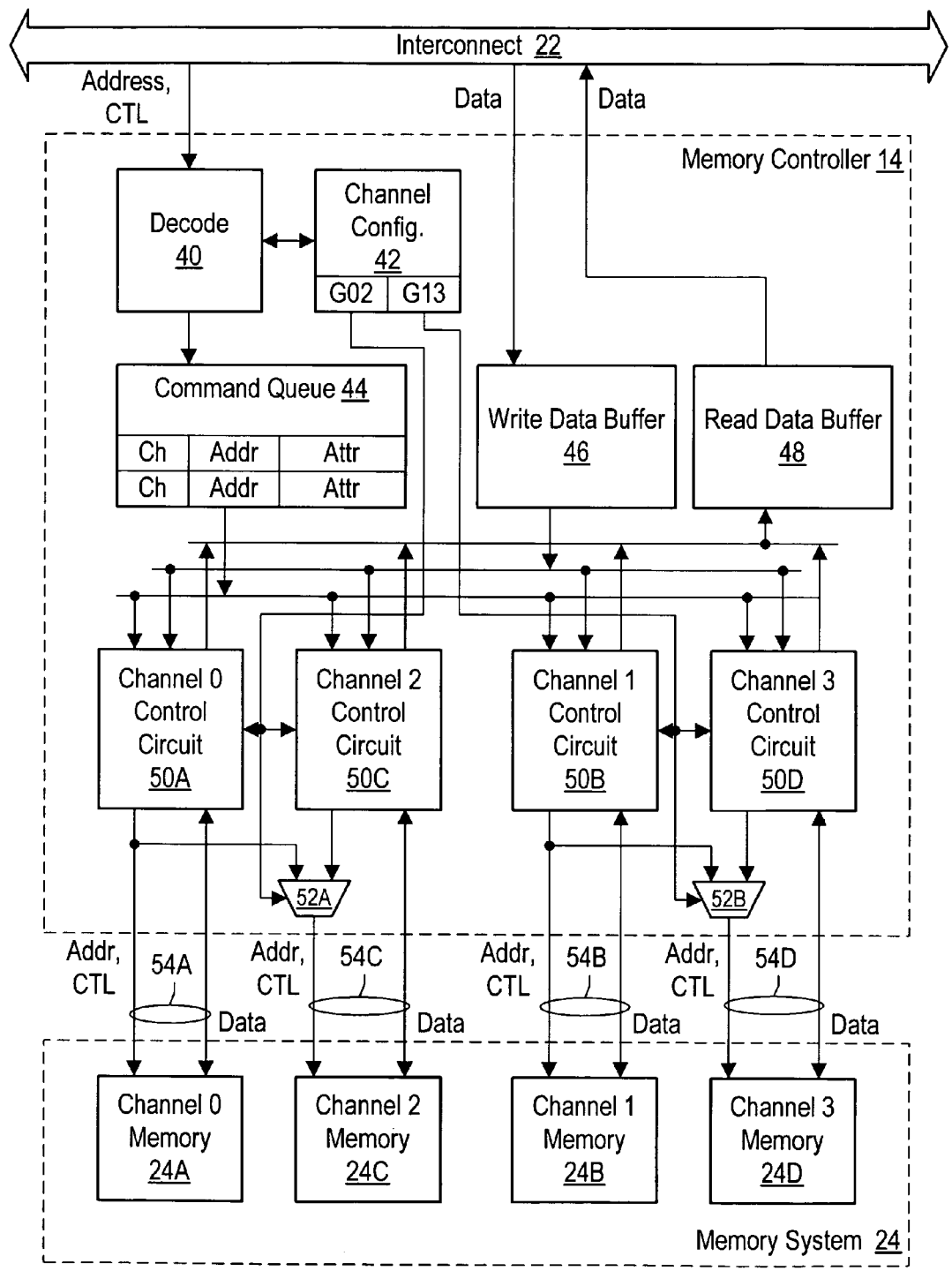
FIG. 2 is a block diagram of one embodiment of a memory controller.

A block diagram of one embodiment of the memory controller 14 is illustrated in FIG. 2. The embodiment illustrated in FIG. 2 (and embodiments further described with regard to FIGS. 3-8) may be employed in the system 10 shown in FIG. 1. Alternatively, the memory controller 14 may be employed in any other desired system.

In the embodiment of FIG. 2, the memory controller 14 includes a decode circuit 40, one or more channel configuration registers 42, a command queue 44, a write data buffer 46, a read data buffer 48, a set of channel control circuits 50A-50D, and multiplexors (muxes) 52A-52B. The channel control circuits 50A-50D are coupled to respective channels 54A-54D. Also illustrated in FIG. 2 is an embodiment of the memory system 24, including memory devices forming memory coupled to each of the channels 54A-54D. The memory is illustrated in FIG. 2 as channel 0 memory 24A, channel 1 memory 24B, channel 2 memory 24C, and channel 3 memory 24D. The decode circuit 40 is coupled to receive address and control information for transactions from the interconnect 22, and is coupled to the channel configuration registers 42 and the command queue 44. The write data buffer 46 is coupled to receive data from the interconnect 22, and the read data buffer 48 is coupled to provide data on the interconnect 22. The command queue 44, the write data buffer 46, and the read data buffer 48 are coupled to the channel control circuits 50A-50D. The channel control circuits 50A and 50C are coupled to receive a G02 indication from the channel configuration registers 42, and the channel control circuits 50B and 50D are similarly coupled to receive a G13 indication from the channel configuration registers 42. The muxes 52A, 52B receive the G02 and G13 indications, respectively, as selection controls. The mux 52A is coupled to receive address and control information from the channel control circuits 50A and 50C and is coupled to provide the address and control information to the channel 2memory 24C. The mux 52B is coupled to receive address and control information from the channel control circuits 50B and 50D an is coupled to provide the address and control information to the channel 3 memory 24D.

Each of the channels 54A-54D provides an independent access path to the memory system 24. The channels may be ganged together via operation of the memory controller 14 such that the ganged channels are concurrently used to transfer data for the same command. For example, in FIG. 2, channel 0 and channel 2 (reference numerals 54A and 54C) may be ganged together. Similarly, channel 1 and channel 3 (reference numerals 54B and 54D) may be ganged together. Channels are referred to as "ganged" if at least the data portion of the channels are operated together as if they were one channel. For example, data concurrently transmitted on the ganged channels may be data for the same command. The address and control information on the ganged channels may be the address and control information for the same command. In some embodiments, the address and control information from only one of the channels may be used, in which case the address and control information on the other channels may be a don't care (e.g. may not be driven). On the other hand, address and data information concurrently transmitted on non-ganged channels may be for separate commands.

In the illustrated embodiment, the memory controller 14 is programmable via the channel configuration registers 42 to either gang or not gang the channels. The G02 field may be programmed to indicate if channels 0 and 2 are ganged, and the G13 field may similarly be programmed to indicate if channels 1 and 3 are ganged. In one embodiment, the G02 field may comprise a bit indicative, when set, that channels 0 and 2 are ganged and indicative, when clear, that channels 0 and 2 are not ganged. The opposite binary definitions of the bit may be used in other embodiments, as may any other encoding of the indication. For the remainder of this description, the G02 indication will be referred to as the G02 bit, but any indication may be used. The G13 indication may be similarly defined, and the G13 bit will be used for the remainder of the description (although any indication may be used).

Generally, the decode circuit 40 is coupled to receive transactions from the interconnect 22 (particularly, the address and control information from the transaction). The decode circuit 40 may allocate a command queue 44 entry for the transaction if the memory controller 14 is to respond to the transaction. For example, the memory controller 14 may respond to a transaction if the transaction is a memory transaction and is not serviced by the L2 cache 36. Additionally, in some coherent embodiments that support a coherent agent providing data directly for a transaction (e.g. if the coherent agent has modified the data), the memory controller may respond to the transaction if no coherent agent is to supply the data. If the transaction is a write, a write data buffer 46 entry may also be allocated to store the write data when it is provided on the interconnect 22. If the transaction is a read, a read data buffer 48 entry may be allocated. Alternatively, the read data buffer 48 entry may be allocated when the command is dispatched to the corresponding channel control circuit 50A-50D to perform the read from the memory system 24.

The decode circuit 40 may generate a command for the transaction using information from the channel configuration registers 42. Among other things, the decode circuit 40 may determine which of the channels (0-3 in the embodiment of FIG. 2) is selected for the command. The channel configuration registers 42 may store channel attributes used to select a channel. The channel attributes may be defined in any desired fashion. For example, the channel attributes may include a programmable address range for each channel, defining the portion of the memory address space mapped to that channel. In some embodiments, the channels may be interleaved (such that the interleaved channels cover the same address space, and a specific channel is selected for a command using one or more of the least significant address bits of the transaction address). Additionally, a channel interface may include two or more chip selects, and which chip select to assert for a given address may be programmable in the channel configuration registers 42. Other channel attributes may also be programmable (e.g. which portions of the address to use for the row, column, and bank selection in the memory devices, etc.).

If channels are ganged, in the present embodiment, the decode circuit 40 may select one of the channels as the channel for the command. For example, if channels 0 and 2 are ganged, the decode circuit 40 may generate channel 0 for commands to be serviced on the ganged combination of channels 0 and 2. Similarly, if channels 1 and 3 are ganged, the decode circuit 40 may generate channel 1 for commands to be serviced on the ganged combination of channels 1 and 3.

The generated command may include the channel number (Ch in the command queue 44), the address (Addr in the command queue 44) and other attributes (e.g. type of command, such as read or write, size of the command, chip selects, etc.). The generated command is stored in the command queue 44, and at some point is issued to the channel control circuit 50A-50D indicated by the channel number. Any scheduling algorithm may be used. In some embodiments, for example, the memory controller 14 may attempt to schedule commands of the same type (read or write) consecutively to the same channel, to avoid turn-around on the data portion of the channel. Other scheduling considerations may apply (e.g. attempting to schedule commands to the same memory page, to take advantage of the page being open in the memory system 24; relative age of the commands; etc.).

Generally, each of the channel control circuits 50A-50D are coupled to receive commands issued from the command queue 44, and to receive data for write commands from the write data buffer 46. The channel control circuits 50A-50D are coupled to provide read data to the read data buffer 48 (which may buffer the read data until the read data may be delivered on the interconnect 22). The channel control circuits 50A-50D may generally transfer a block of data for a given command. The block may be of any size. For example, a block may be 32 bytes in one embodiment. The size of the block may correspond to the size of a cache line in the system 10.

Operation of channels 0 and 2 (reference numerals 54A and 54C) and related circuitry will be described next. Operation of channels 1 and 3 (reference numerals 54B and 54D) and related circuitry may be similar.

If the channels 54A and 54C are ganged (G02 bit set), the channel control circuit 50C may be idle in this embodiment. The decode circuit 40 may not generate commands with channel number 2, and thus the channel control circuit 50C may not receive any commands dispatched from the command queue 44. The mux 52A selects the address and control information from the channel control circuit 50A for the address and control portion of the channel 54C, and thus both the channels 54A and 54C may be used for transferring data for commands transmitted to the channel control circuit 50A. In this case, the data corresponding to a given command is stored across the channel memories 24A and 24C (that is, ½ of the data may be stored in the channel 0 memory 24A and the other ½ of the data may be stored in the channel 2 memory 24C).

Data is transferred on the data portion of both channels 54A and 54C if the channels are ganged. The data may be routed through the corresponding channel control circuits 50A and 50C from the write data buffer 46 or to the read data buffer 48. Alternatively, in other embodiments, the data may be routed through one channel control circuit. For example, the embodiment illustrated in FIG. 5 includes a data normalizer circuit that permits data to be routed through the channel control circuit 50A when the channels 54A and 54C are ganged.

Figure 3:
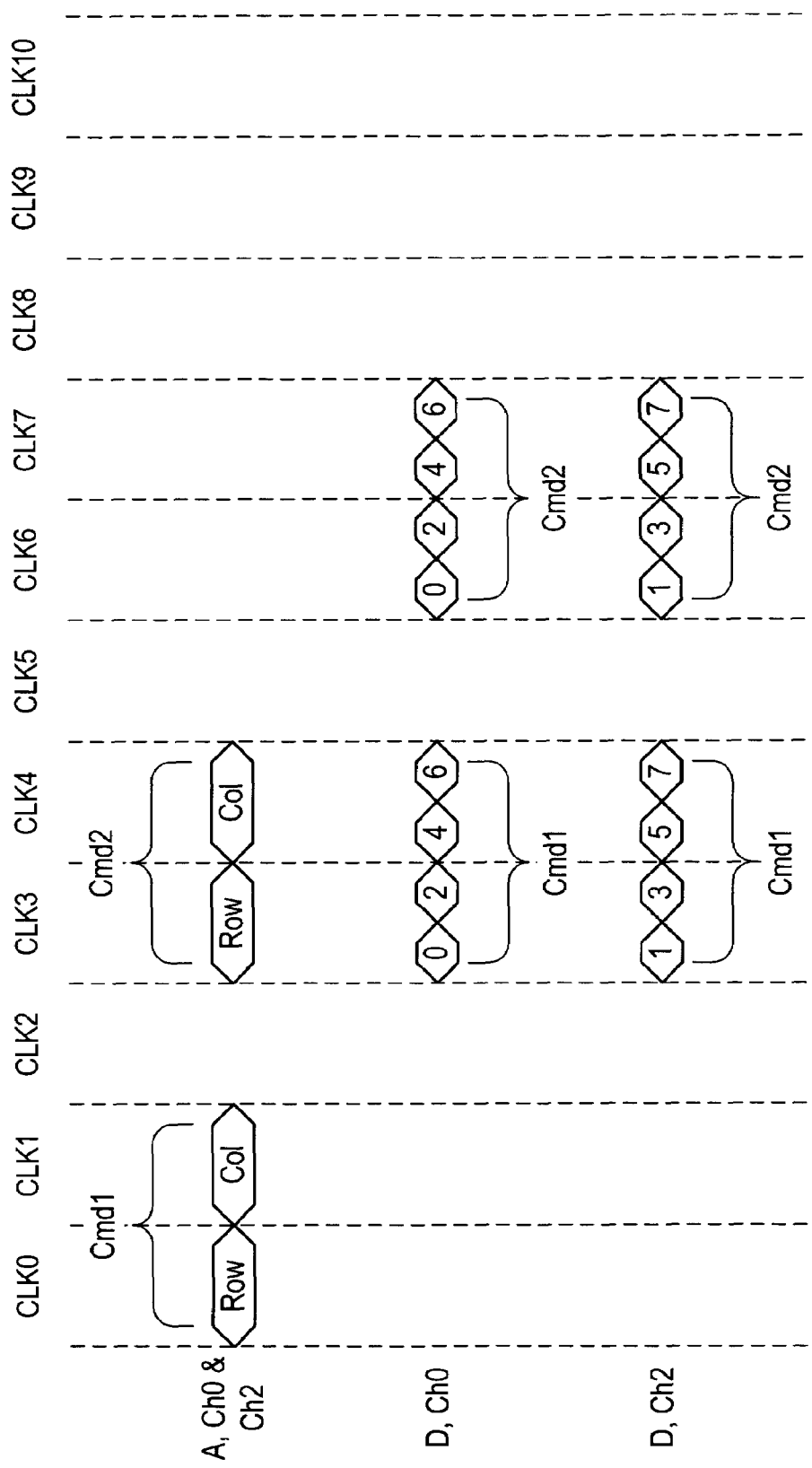
FIG. 3 is a timing diagram illustrating exemplary data transfers on a pair of ganged channels.

FIG. 3 is a timing diagram illustrating exemplary operation of the memory controller 14 with channels 0 and 2 ganged. Clock cycles (of the memory clock employed by the channel memories 24A-24D and the channel control circuits 50A-50D) are illustrated in FIG. 3 and are delimited by vertical dashed lines. Illustrated in FIG. 3 are the address and control portions of the channels (labeled A, Ch0 & Ch2 in FIG. 3) as well as the data on each of the channels (labeled D, Ch0 and D, Ch2 respectively). FIG. 3 illustrates timings consistent with RLDRAM. Other embodiments may employ other types of memory.

In clocks CLK0 and CLK1 in FIG. 3, the row and column address and control information for a command Cmd1 are transmitted on the address and control portion of channels 54A and 54C (through the mux 52A). Similarly, the row and column information for a command Cmd2 are transmitted in clocks CLK3 and CLK4.

The data corresponding to command Cmd1 is transmitted on the data portions of the channels 54A and 54C during clocks CLK3 and CLK4. For the example of FIG. 3, the data is transferred twice per cycle (DDR), with 8 total transfers comprising the block (4 transfers each on channels 54A and 54C). The transfers are numbered 0 to 7 in clocks CLK3 and CLK4. The numbering may represent the order of data within the block (e.g. transfer 0 may be the first data in the block, followed by transfer 1, etc. up to transfer 7). Alternatively, the order within the block of the data may differ from the numbering shown (e.g. the transfers on channel 0 54A may represent the first data within the block, followed by the transfers on channel 2 54C, or any other ordering may be used). The data corresponding to command Cmd2 may similarly be transmitted during clocks CLK6 and CLK7 on the data portions of the channels 0 and 2.

As illustrated in FIG. 3, an idle cycle on the data portions of the channels occurs between the Cmd1 data and the Cmd2 data (clock CLK5). The idle cycle may be a "bus turnaround" cycle if, for example, Cmd1 is a read and Cmd2 is a write (or vice versa). Bus turnaround cycles may also be used if different memory devices are driving data for Cmd1 as compared to Cmd2.

Accordingly, the bandwidth utilization as illustrated in FIG. 3 is approximately 66% (two clock cycles of transfer and one clock cycle of non-transfer). Bandwidth utilization may be improved by attempting to schedule consecutive commands that do not require a bus turnaround cycle in between, but some number of bus turnaround cycles may generally occur in a stream of requests.

Returning to FIG. 2, if the channels 54A and 54C are not ganged (G02bit clear), each of the channel control circuits 50A and 50C may operate independently, performing different commands concurrently on their respective channels 54A and 54C. In this case, the data corresponding to a given command is stored in one channel memory 24A or 24C, and is read or written over the corresponding channel 54A or 54C. With the G02 bit clear, the mux 52A selects address and control information from the channel control circuit 50C onto the address and control portion of the channel 54C.

Figure 4:
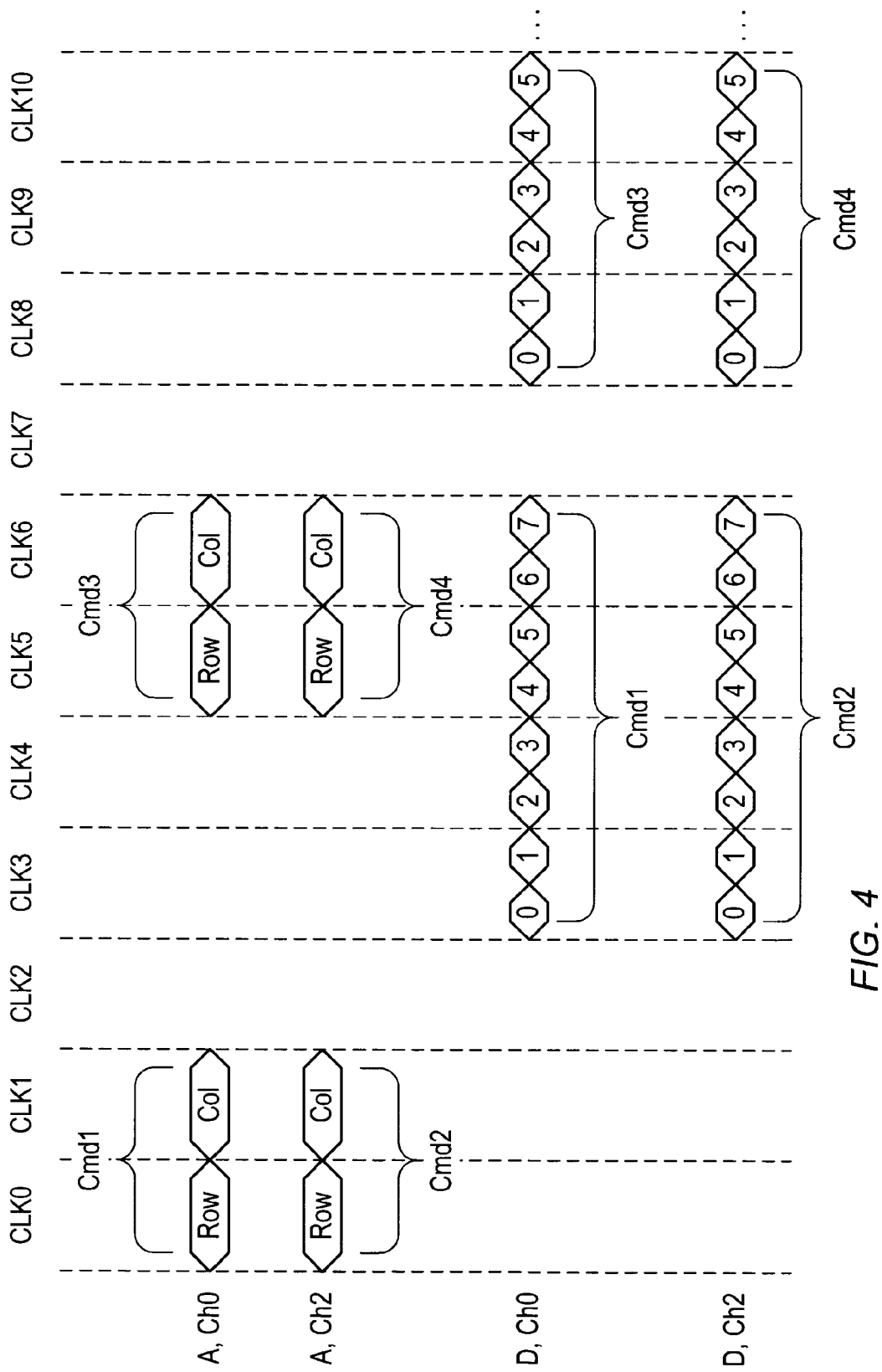
FIG. 4 is a timing diagram illustrating exemplary data transfers on a pair of channels that are not ganged.

FIG. 4 is a timing diagram illustrating exemplary operation of the memory controller 14 with channels 0 and 2 not ganged. Similar to FIG. 3, clock cycles (of the memory clock employed by the channel memories 24A-24D and the channel control circuits 50A-50D) are illustrated in FIG. 4 and are delimited by vertical dashed lines. Illustrated in FIG. 4 are the address and control portions of the channels (labeled A, Ch0 and A, Ch2 in FIG. 4, respectively) as well as the data on each of the channels (labeled D, Ch0 and D, Ch2 respectively). FIG. 4 illustrates timings consistent with RLDRAM. Other embodiments may employ other types of memory.

In clocks CLK0 and CLK1 in FIG. 4, the row and column command information for a command Cmd1 are transmitted on the address and control portion of channel 54A. Similarly, the row and column command information for a command Cmd1 are transmitted on the address and control portion of channel 54C. The row and column information for a commands Cmd3 and Cmd4 are transmitted in clocks CLK5 and CLK6 on the channels 54A and 54C, respectively.

The data corresponding to command Cmd1 is transmitted on the data portion of the channels 54A during clocks CLK3 through CLK6. For the example of FIG. 4, the data is transferred twice per cycle, with 8 total transfers comprising the block. The transfers are numbered 0 to 7, similar to the discussion above with respect to FIG. 3. The data corresponding to command Cmd2 may similarly be transmitted during clocks CLK3 through CLK6 on the data portion of the channel 54C. The first part of the data transfers for commands Cmd3 and Cmd4 are illustrated in clocks CLK8 through CLK10.

Similar to FIG. 3, an idle cycle is illustrated in FIG. 4 on the data portions of the channels, between the Cmd1 data and the Cmd3 data and between the Cmd2 data and the Cmd4 data (clock CLK7). However, 4 clock cycles of data transfer occur for each command. Accordingly, the bandwidth utilization as illustrated in FIG. 4 is approximately 80% (four clock cycles of transfer and one clock cycle of non-transfer). As mentioned above, bandwidth utilization may be improved by attempting to schedule consecutive commands that do not require a bus turnaround cycle in between, but some number of bus turnaround cycles may generally occur in a stream of requests. The same scheduling techniques may be used whether the channels are ganged or not. Thus, bandwidth utilization may generally be higher, for a given set of commands, when the channels are not ganged.

Since the bandwidth utilization is higher in the non-ganged configuration, the non-ganged case may provide higher bandwidth characteristics than the ganged configuration. In other words, actual bandwidth may be higher in the non-ganged configuration. The latency in the non-ganged configuration may be higher than in the ganged configuration. Accordingly, by configuring the channels as ganged or non-ganged, latency and bandwidth tradeoffs may be made.

It is noted that, while FIG. 4 illustrates commands Cmd1 and Cmd2 occurring at the same time, generally the commands may be skewed with respect to one another while still achieving the higher bandwidth utilization (since the channels are being operated independently). Thus, in the non-ganged configuration, two commands may be concurrently performed on the non-ganged channels if at least some data transfers of the two commands occur in the same clock cycle, even if the two commands are not synchronized to the same clock cycles overall.

Generally, the channels 54A-54D comprise the interface signals used by the type of memory devices forming the channel memory 24A-24D. Thus, there may be address lines (which may transmit both row and column information, for example), control lines (such as row address strobe and column address strobe, also known as RAS and CAS, respectively), chip select lines, etc. The data portion may be a bi-directional set of lines in the illustrated embodiment. As used herein, the term "channel" refers to any communication media that permits access to one or more memory devices in a memory system independent of other communication media that may be connected to the memory system. A "channel control circuit" comprises the circuitry for interfacing to the channel (e.g. generating the correct protocol and timing on the channel).

One or more memory devices may form each of the channel memories 24A-24D. As used herein, a memory device may include individual memory chips, either packaged or unpackaged, as well as circuit boards or other modules to which multiple memory chips are attached (e.g. dual in line memory modules, or DIMMs, single in line memory modules, or SIMMs, etc.). In some cases, when channels are ganged, the same memory devices may be shared across the channels. For example, in one embodiment, each channel is 32 bits wide. Currently, standard DIMMs are typically 64 bits wide. Thus, one or more DIMMs may be installed across two ganged channels (providing 64 bits of data transfer width). In other words, the 64 bit data output of each DIMM may include 32 bits coupled to one channel (e.g. channel 0) and 32 bits coupled to the other channel (e.g. channel 2). In such cases, the address and control information of the second if the ganged channels may be ignored. Accordingly, muxes 52A-52B may be optional, depending on whether the address and control information is used on each of the ganged channels.

It is noted that, while the embodiment of FIG. 2 dispatches a command to one of the channel control circuits 50A-50D in a ganged combination, and uses a mux to transmit address and control information on the other channel of the ganged combination, other embodiments may implement the ganging in other ways. For example, the same commands may be issued to each of the channel control circuits 50A-50D that corresponding to a ganged set of channels (and the muxes 52A-52B may be deleted). The channel control circuits 50A-50D may process the commands normally, except that less data may be transferred (since the remaining data is being transferred on other channels).

It is noted that, while the embodiment of FIG. 2 permits pairs of channels to be ganged, other embodiments may permit any number of channels to be ganged (e.g. 3, 4, or more channels). Furthermore, while the embodiment of FIG. 2 permits the independent ganging of two sets of channels (one set including channels 0 and 2 and the other set including channels 1 and 3), other embodiments may implement one set of gangable channels or more than two sets of gangable channels, as desired.

It is further noted that, while the G02 and G13 bits are implemented in the channel configuration registers 42 in the illustrated embodiment, other embodiments may indicate the ganging or non-ganging of channels in other ways. For example, one or more input pins to the system 10 may be tied up or down to indicate whether channels are to be ganged or not, or input pins may be sampled during reset to indicate whether channels are to be ganged or not.

In some embodiments, the decode circuit 40 may be pipelined to decode transactions over several clock cycles. The decode circuit 40 may also perform additional functions. For example, in one embodiment, the address space on the interconnect 22 includes portions mapped to the memory controller 14 and portions mapped to other agents (e.g. various input/output agents, not shown). The decode circuit 40 may map the portions of the address space on the interconnect 22 to a contiguous memory address space used within the memory controller 14. The memory address space may be mapped to the various channels. Additionally, in one embodiment, the interconnect 22 may support coherency via a response phase subsequent to the address phase. The pipeline of the decode circuit 40 may permit coherency to be resolved for a particular transaction prior to the corresponding command being stored into the command queue 44. If the coherency resolution causes the memory controller 14 to not service the transaction, then no command may be generated for the command queue 44. It is noted that, in other embodiments, the decode circuit 40 may be implemented between the command queue 44 and the channel control circuits 50A-50D, or the function of the decode circuit 40 may be integrated into the channel control circuits 50A-50D.

It is noted that, in some embodiments, a portion of the memory controller 14 may operate in a memory clock domain corresponding to a memory clock used by the memory system 24, while a second portion of the memory controller 14 may operate in a clock domain corresponding to a clock on the interconnect 22. In such embodiments, information passing between the clock domains may be synchronized to the receiving clock domain. In one embodiment, the clock domain boundary may be between the command queue 44, write buffer 46, and read buffer 48 (on the interconnect clock domain side) and the channel control circuits 50A-50D (on the memory clock domain side).

Figure 5:
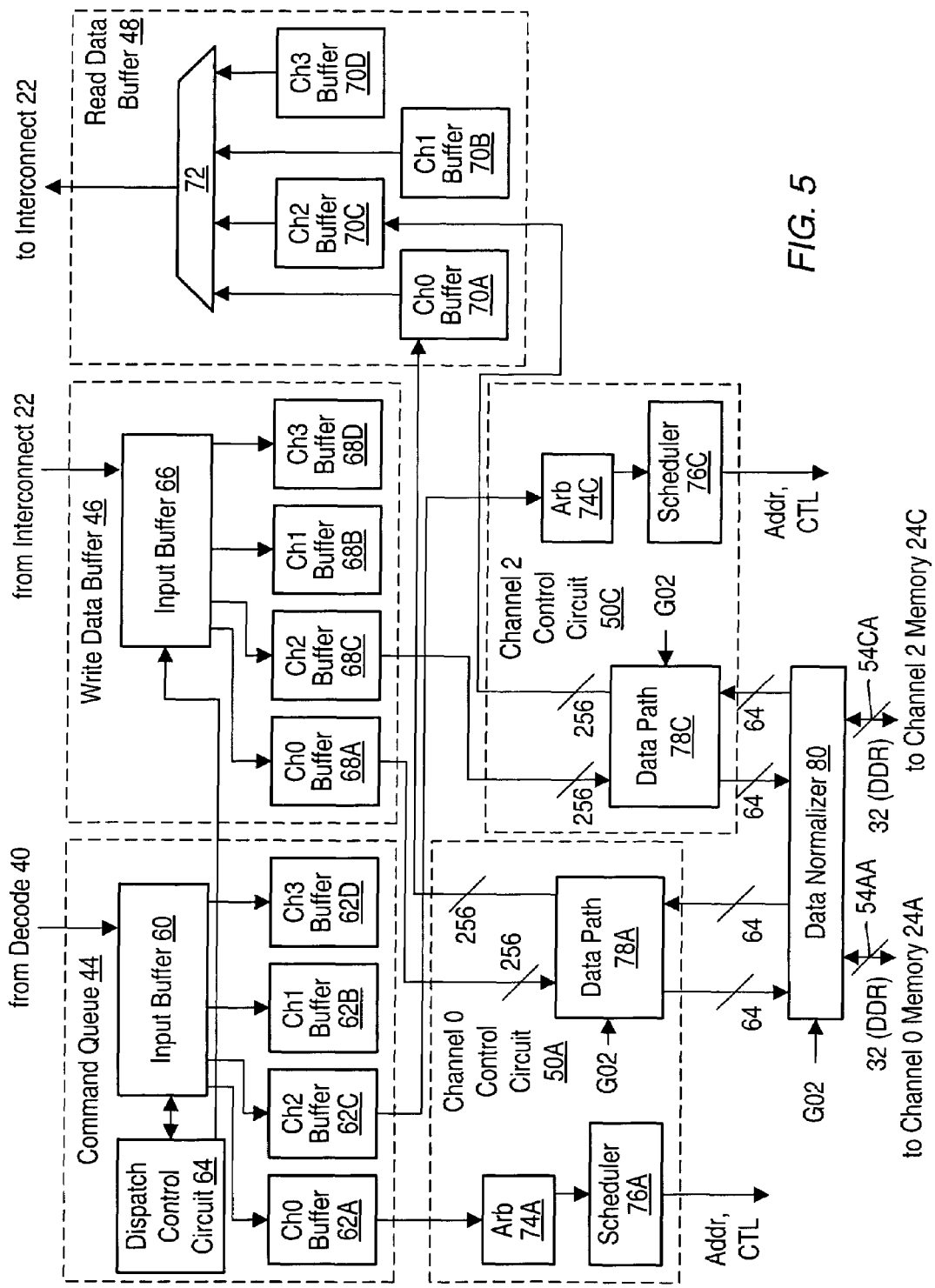
FIG. 5 is a block diagram of one embodiment of the memory controller in more detail.

Turning next to FIG. 5, a block diagram of a portion of one embodiment of the memory controller 14 shown in FIG. 2 is shown in more detail. In the embodiment of FIG. 5, the command queue 44, the write data buffer 46, the read data buffer 48, and the channel control circuits 50A and 50C are shown. The channel control circuits 50B and 50D may be similar to the channel control circuits 50A and 50C. The embodiment of FIG. 5 may be designed for double data rate (DDR) memory devices (e.g. DDR SDRAMs), which transfer two data bits per data wire per clock cycle of the memory clock used by the SDRAMs. Other embodiments may employ SDR data rates, or other multiple data rates.

In the embodiment of FIG. 5, the command queue 44 may include an input buffer 60, a set of channel buffers 62A-62D corresponding to the channel control circuits 50A-50C respectively, and a dispatch control circuit 64. The input buffer 60 receives the commands from the decode circuit 40, and stores the commands. The dispatch control circuit 64 is coupled to the input buffer 60, and is configured to dispatch the commands therein to one of the channel buffers 62A-62D depending on which channel the command is to be serviced on (and optionally dependent on other factors, such as ordering constraints, attempts to schedule consecutive commands of the same type (read or write), etc.). In one embodiment, the input buffer 60 may be a shifting first-in, first-out structure and the channel buffers 62A-62D may each be a memory. Age indications may be used in the channel buffers 62A-62D to indicate the relative order of commands in the channel buffers 62A-62D. Each of the channel buffers 62A-62D is coupled to a respective channel control circuit 50A-50D (e.g. the channel buffer 62A is coupled to the channel control circuit 50A and the channel buffer 62C is coupled to the channel control circuit 50C in FIG. 5).

The write data buffer 46 may similarly include an input buffer 66 and a set of channel buffers 68A-68D. The input buffer 66 is coupled to receive write data from the interconnect 22. The write data may be dispatched to the channel buffer 68A-68D corresponding to the channel on which the write is to be performed, and thus may be available to the corresponding channel control circuit 50A-50D performing the write. Each of the channel buffers 68A-68D is coupled to a respective channel control circuit 50A-50D (e.g. the channel buffer 68A is coupled to the channel control circuit 50A and the channel buffer 68C is coupled to the channel control circuit 50C in FIG. 5). The same dispatch control circuit 64 may handle dispatching of the write data from the input buffer 66 to the channel buffers 68A-68D, as illustrated in FIG. 5, or separate control circuitry may be provided.

The read data buffer 48 may also be configured with channel buffers 70A-70D corresponding to respective channel control circuits 50A-50C. For example, the channel buffer 70A is coupled to the channel control circuit 50A and the channel buffer 70C is coupled to the channel control circuit 50C in FIG. 5. The channel control circuits 50A-50D may supply read data to the respective channel buffers 70A-70D. The read data buffer 48 may select between the channel buffers 70A-70D (e.g. the mux 72 illustrated in FIG. 5) to provide data on the interconnect 22.

In the illustrated embodiment, each channel control circuit 50A-50D may include an arbiter (arb) (e.g. arb 74A in the channel control circuit 50A and arb 74C in the channel control circuit 50C), a scheduler (e.g. scheduler 76A in the channel control circuit 50A and scheduler 76C in the channel control circuit 50C), and a data path circuit (e.g. data path circuit 78A in the channel control circuit 50A and data path circuit 78C in the channel control circuit 50C). The arbs 74 are coupled to respective channel buffers 62A-62D and are coupled to the schedulers 76, which are coupled to the address and control outputs of the channel control circuits 50 to the respective channels 54. Generally, the arbs 74 may scan the commands in the corresponding channel buffers 62, and may select the next command to be serviced. The scheduler 76 may receive the selected command, and may determine when to initiate the command on the corresponding channel (e.g. enforcing any timing or protocol restrictions of the channel memory coupled to that channel).

The routing of data, including handling the ganging of channels, may be performed in the embodiment of FIG. 5 by the data path circuits 78A and 78C and a data normalizer circuit 80. A similar data normalizer circuit may be provided for channels 1 and 3 as well (not shown in FIG. 5). Both the data path circuits 78A and 78C and the data normalizer circuit 80 are coupled to receive the G02 bit from the channel configuration registers 42.

In the illustrated embodiment, each channel control circuit 50A-50D may concurrently receive or supply a block of data from the data buffers 46 and 48 for a given command (e.g. 256 bits, or 32 bytes, in this embodiment). In other embodiments, a block of data may be transferred to and from the channel control circuits 50A-50D over two or more clock cycles, as desired. The data path circuits 78A and 78C may capture the block of data (for a write) from the data buffer and transfer the block of data to the data normalizer circuit 80 in smaller transfers (e.g. 64 bits, in one embodiment). For a read, the data path circuits 78A and 78C may gather the smaller transfers from the data normalizer circuit 80 and transfer the gathered block to the read data buffer 48.

The data normalizer circuit 80 routes data from the channel control circuits 50A and 50C to the data portions of the channels 54A and 54C (e.g. reference numerals 54AA and 54CA in FIG. 5), taking into account whether or not the channels are ganged. That is, the data normalizer circuit 80 may transmit the data from the data portions of both channels 54A and 54C to the data path circuit 78A for a read if the channels are ganged, or may transmit the data from the data portion of channel 54A to the data path circuit 78A and the data from the data portion of channel 54C to the data path circuit 78C for a read if the channels are not ganged. Similarly, the data normalizer circuit 80 may transmit write data received from the data path circuit 78A on the data portions of both channels 54A and 54C if the channels are ganged, or may transmit write data from the data path circuit 78A on the data portion of the channel 54A and write data from the data path circuit 78C on the data portion of the channel 54C if the channels are not ganged. The data portions of each channel 54A and 54C may operate at the same rate regardless of whether the channels are ganged (e.g. 32 bits DDR in this embodiment). The interface between the data path circuit 78A may be SDR if the channels are not ganged, or DDR if the channels are ganged (thus handling the two channels of 32 bit DDR). The interface between the data path circuit 78B may be SDR, since the channel control circuit 50C may be idle, in this embodiment, if the channels are ganged. As used herein, a data normalizer circuit may include circuitry for routing data to/from multiple channels from/to one channel control circuit (if channels are ganged) or from/to respective channel control circuits (if channels are not ganged).

It is noted that, in other embodiments, the channel control circuits 50A and 50C and the data normalizer 80 (and similar circuitry for the channel control circuits 50B and 50D) may be implemented with different organizations of the command queue 44, the write data buffer 46, and the read data buffer 48 than those shown in FIG. 5. For example, a single buffer may be implemented in each of the command queue 44, the write data buffer 46, and the read data buffer 48 and may be shared among the channel control circuits 50A-50D.

It is noted that, while specific widths are shown in FIG. 5 (e.g. 32 bits DDR to the channel memories 24A and 24C, 64 bits between the data normalizer circuit 80 and the data path circuits 78A and 78C, and 256 bits between the data path circuits 78A and 78C and the data buffers 46 and 48), other embodiments may vary any of the widths and/or data rates, as desired.

It is further noted that, while SDR and DDR data rates are discussed with respect to FIG. 5 (and FIGS. 6-8 below), other embodiments may employ other data rates (e.g. quad data rate, or any other data rate). Generally, a multi-data rate may be supported in which multiple transfers per wire per clock cycle are performed.

Figure 6:
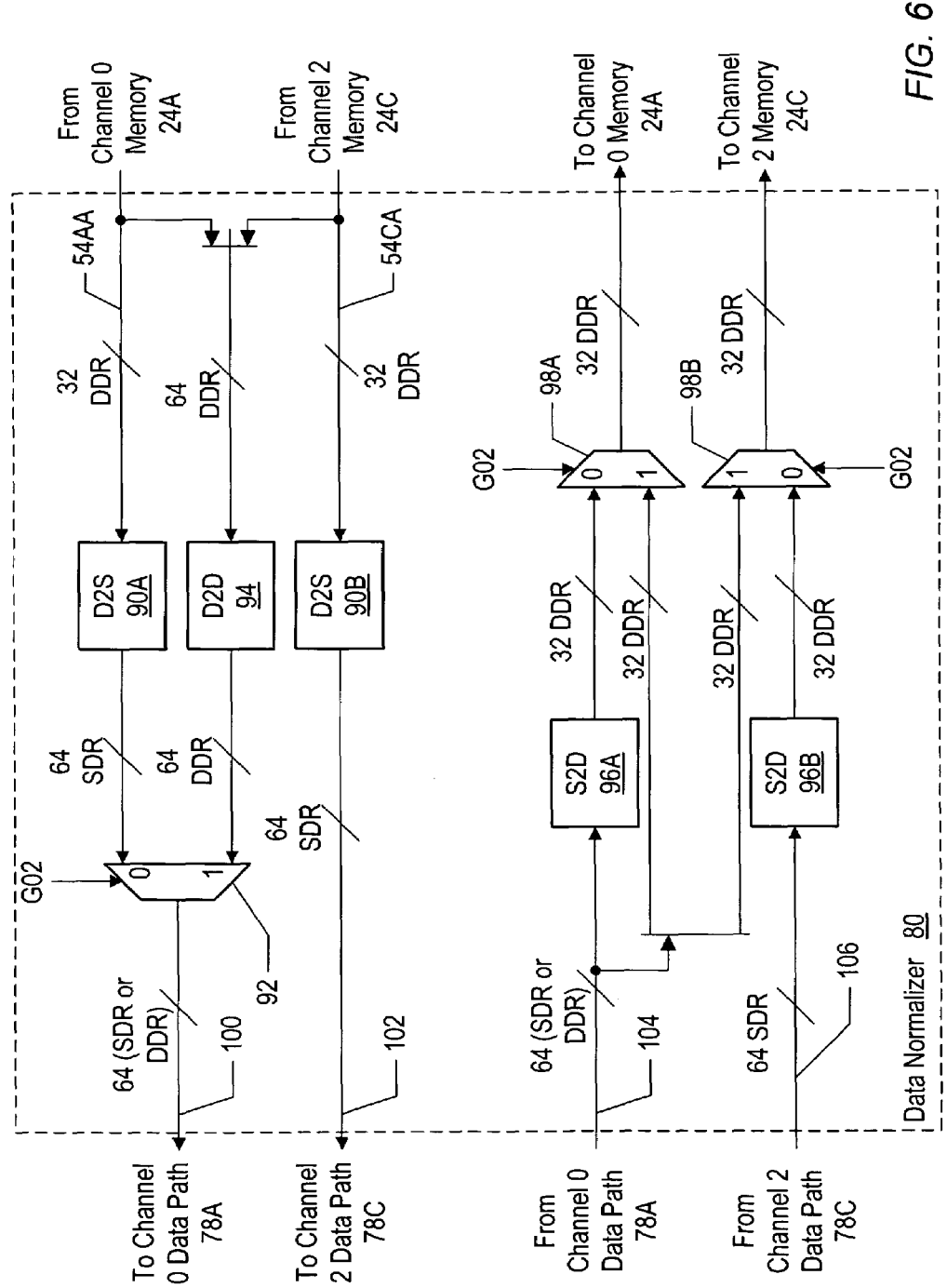
FIG. 6 is a block diagram of one embodiment of a data normalizer circuit shown in FIG. 5.

Turning now to FIG. 6, a block diagram of one embodiment of the data normalizer circuit 80 is shown. The read data path from the channel memories 24A and 24C to the data path circuits 78A and 78C is shown on the upper part of FIG. 6, and the write data path from the data path circuits 78A and 78C to the channel memories 24A and 24C is shown on the lower part of FIG. 6.

In the illustrated embodiment, each channel memory 24A and 24C provides 32 bits of DDR read data input to the data normalizer circuit 80. If channels 0 and 2 are not ganged, then the data normalizer circuit 80 converts each DDR read data input to a corresponding 64 bit SDR read data output to the corresponding data path circuits 78A and 78C. If channels 0 and 2 are ganged, the data normalizer circuit 80 merges the two 32 bit DDR read data inputs to a 64 bit DDR read data output to the data path circuit 78A.

Particularly, in FIG. 6, the 32 bit DDR input 54AA from the channel 0 memory 24A is coupled to a double to single (D2S) circuit 90A, which converts the 32 bit DDR input data to 64 bit SDR data output to a mux 92. Additionally, the 32 bit DDR input 54AA is concatenated with the 32 bit DDR input 54CA from the channel 2 memory 24C to provide a 64 bit DDR input. The 64 bit DDR input is coupled to a double to double (D2D) register circuit 94, which outputs a corresponding 64 bit DDR output (one half clock cycle delayed) to the mux 92. The mux 92 is controlled by the G02 bit. If the G02 bit is zero (channels not ganged), the mux 92 selects the output of the D2S circuit 90A as the output 100 to the data path circuit 78A. Thus, in the non-ganged configuration, the output is 64 bits of SDR data sourced by the channel 0 memory 24A. On the other hand, if channels 0 and 2 are ganged, the mux 92 selects the 64 bit DDR output of the D2D circuit 94. Thus, in the ganged configuration, the output 100 is 64 bits of DDR data sourced by a combination of the channel 0 memory 24A and the channel 2 memory 24C. The 32 bit DDR input 54CA is further coupled to a D2S circuit 90B, which outputs 64 bits of SDR data (reference numeral 102) to the data path circuit 78C (sourced from the channel 2 memory 24C).

In the illustrated embodiment, each data path circuit 78A and 78C provides a 64 bit write data input to the data normalizer circuit 80 (reference numerals 104 and 106, respectively). The data path circuit 78A provides either SDR (non-ganged) or DDR (ganged) write data on the input 104, while the data path circuit 78C provides an SDR write data input 106 since it is only used when the channels are not ganged in this embodiment. The write data input 104 is coupled to a single to double (S2D) circuit 96A, which converts the 64 bit SDR data to a 32 bit DDR output. The 32 bit DDR output is provided to a mux 98A, which is controlled by the G02 bit. If channels 0 and 2 are not ganged (G02 bit clear), the mux 98A selects the output of the S2D circuit 96A. Similarly, the S2D circuit 96B is coupled to the write data input 106 and provides a 32 bit DDR output to the mux 98B, which is controlled by the G02 bit. If channels 0 and 2 are not ganged, the mux 98B selects the output of the S2D circuit 96B. Thus, in the non-ganged configuration, each channel 0 and 2 receives 32 bits of DDR data sourced from a respective channel control circuit 50A or 50C.

The write data input 104 is also divided into lower and upper halves, which are respectively coupled to the muxes 98A and 98B. If the channels 0 and 2 are ganged, the muxes 98A-98B select the respective halves of the input 104 as 32 bit DDR output data to the channel memories 24A and 24C. While upper and lower halves are used in this example, any non-overlapping sets of bits may be routed to the channel memories 24A and 24C. Thus, in the ganged configuration, each channel 0 and 2 receives 32 bits of DDR data sourced from the channel control circuit 50A.

It is noted that, in some embodiments, the channel memories 24A and 24C may support error correction codes (ECC), and ECC bits may be provided in addition to the data bits. ECC generation may be performed on data provided from the data path circuits 78A and 78C, and ECC checking may be performed on data provided from memory, at any desired point in the data normalizer 80 and/or in the data path circuits 78A and 78C. In one implementation, ECC checking is provided at the outputs of the mux 92 and the D2S circuit 90B, and ECC generation is provided on the inputs 104 and 106.

It is noted that FIG. 6 illustrates separate paths of data to and from a given channel memory (e.g. channel 0 memory 24A). Many memories may actually have a bi-directional data path. Tri-state buffers may be inserted between the data normalizer circuit 80 outputs and the memories 24A and 24C, in some embodiments. Alternatively, in some embodiments, there may be staging circuitry (e.g. registered buffers) between the data normalizer circuit 80 and the memories 24A and 24C for timing reasons. The bi-directional interface to the memories 24A and 24C may be handled in the staging circuitry.

It is noted that the conversion circuits 90A-90B, 94, and 96A-96B may receive a clock for converting data. The clock may be the memory clock used by the channel memories 24A-24D, or a clock synchronized to or phase-locked to the memory clock.

Figure 7:
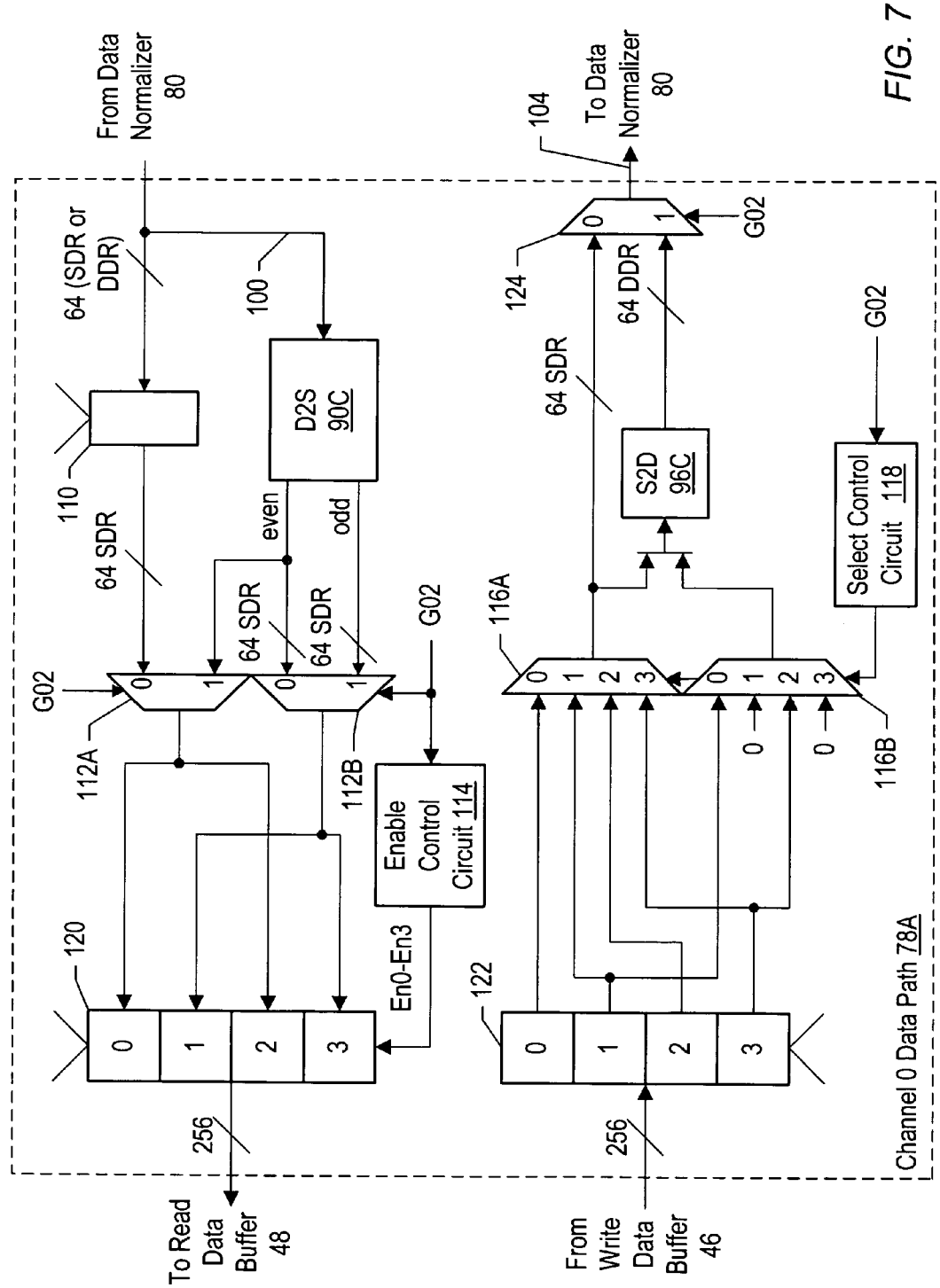
FIG. 7 is a block diagram of one embodiment of a data path circuit of a channel control circuit shown in FIG. 5.

Turning next to FIG. 7, a block diagram of one embodiment of the channel 0 data path circuit 78A is shown. The channel 2 data path circuit 78C may be similar. Alternatively, since the channel 2 data path circuit 78C only handles SDR data in this embodiment, the channel 2 data path circuit 78C may eliminate the circuitry for handling DDR data. The path from the data normalizer circuit 80 to the read data buffer 48 is shown on the upper part of FIG. 7, and the path from the write data buffer 46 to the data normalizer 80 is shown on the lower part of FIG. 7.

The data path circuit 78A may collect the 64 bit data transfers from the data normalizer circuit 80 for a read into a 256 bit block to be written to the read data buffer 48. Accordingly, 4 transfers of data maybe collected (illustrated as "words" 0-3 in FIG. 7). A register 120 may be included for collecting the four words. Similarly, the data path circuit 78A may buffer the 256 bit block from the write data buffer 46 until the 4 words may be transferred to the data normalizer circuit 80. A register 122 may be included to provide the buffering.

The data normalizer 80 provides a read data input 100 to the data path circuit 78A as either SDR (non-ganged) or DDR (ganged) data. The read data input 100 is coupled a flop or other clocked storage device 110 and to a D2S circuit 90C. The D2S circuit 90C outputs even and odd 64 bit SDR data. The even data is the data transferred on the rising edge of the memory clock, and the odd data is the data transferred on the falling edge of the memory clock. Thus, the even data is also the SDR data input, if the input to the D2S circuit 90C is SDR. The output of the flop 110 is provided to the mux 112A, which is controlled by the G02 bit. The mux 112A is also coupled to receive the even data output of the D2S circuit 90C. The mux 112B has one input coupled to the even data output of the D2S circuit 90C and the other input coupled to the odd data output of the D2S circuit 90C, and is also controlled by the G02 bit.

If the G02 bit is clear (non-ganged), then the mux 112A outputs the SDR data from the flop 110 and the mux 112B outputs the SDR data from the D2S circuit 90C. If the G02 bit is set (ganged), the mux 112A outputs the even data from the D2S circuit 90C and the mux 112B outputs the odd data from the D2S circuit 90C. The output of the mux 112A supplies words 0 and 2 of the register 120, and the output of the mux 112B supplies words 1 and 3 of the register 120. An enable control circuit 114 generates write enables (En0-En3, corresponding to words 0 to 3, respectively) based on whether or not channels 0 and 2 are ganged (that is, responsive to the G02 bit). If the channels are not ganged, the enable control circuit 114 activates the enables sequentially each time data is transferred (that is, En0 is asserted first, followed by En1, followed by En2, etc.). If the channels are ganged, the enable control circuit 114 activates En0 and En1 concurrently, then En2 and En3 on the next transfer, thus accumulating the four words.

The register 122 captures the four words of write data from the write data buffer 46. Word 0 of the register 122 is coupled to input 0 of a mux 116A. Word 1 is coupled to input 1 of the mux 116A and to input 0 of the mux 116B. Word 2 is coupled to input 2 of the mux 116A. Word 3 is coupled to input 3 of the mux 116A and to input 2 of the mux 116B. A select control circuit 118 generates the selection controls for the muxes 116A and 116B responsive to the G02 bit. Generally, if the channels are not ganged (G02 bit clear), then the write data is routed as SDR transfers through the mux 116A. If the channels are ganged, then the write data is routed through the muxes 116A and 116B, concatenated to the S2D circuit 96C, and output as DDR transfers.

The select control circuit 118, if the channels are not ganged, sequentially selects words 0 through 3 through the mux 116A. A mux 124, controlled by the G02 bit, selects the output of the mux 116A to the data normalizer circuit 80 (reference numeral 104). In this manner, SDR write data is provided to the data normalizer circuit 80 if the channels are not ganged. On the other hand, if the channels are ganged, the select control circuit 118 alternately selects inputs 0 and 2 of the muxes 116A-116B. In this manner, words 0 and 1 are selected through the muxes 116A-116B, respectively, in one clock and words 2 and 3 are selected through the muxes 116A-116B, respectively, in the next clock. The outputs of the muxes 116A-116B are converted from 128 bit SDR data to 64 bit DDR data in the S2D circuit 96C. The output of the S2D circuit 96C is selected through the mux 124 if the G02 bit is set (ganged).

It is noted that, in some embodiments, if a write of less than a block is supported in the memory controller 14, then the memory controller 14 may perform a read-modify-write operation to update the block. The read data may be supplied to the register 122 to be merged with the partial write data from the write data buffer 46.

It is noted that the conversion circuits 90C and 96C and the flop 110 may receive a clock. The clock may be the memory clock used by the channel memories 24A-24D, or a clock synchronized to or phase-locked to the memory clock. The registers 120 and 122 may also receive a clock, which may be the memory clock or alternatively may be the clock corresponding to the interconnect 22. In the latter case, clock domain conversion circuitry may be included between the registers 120 and 122 and the rest of the circuitry shown in FIG. 7.

Figure 8:
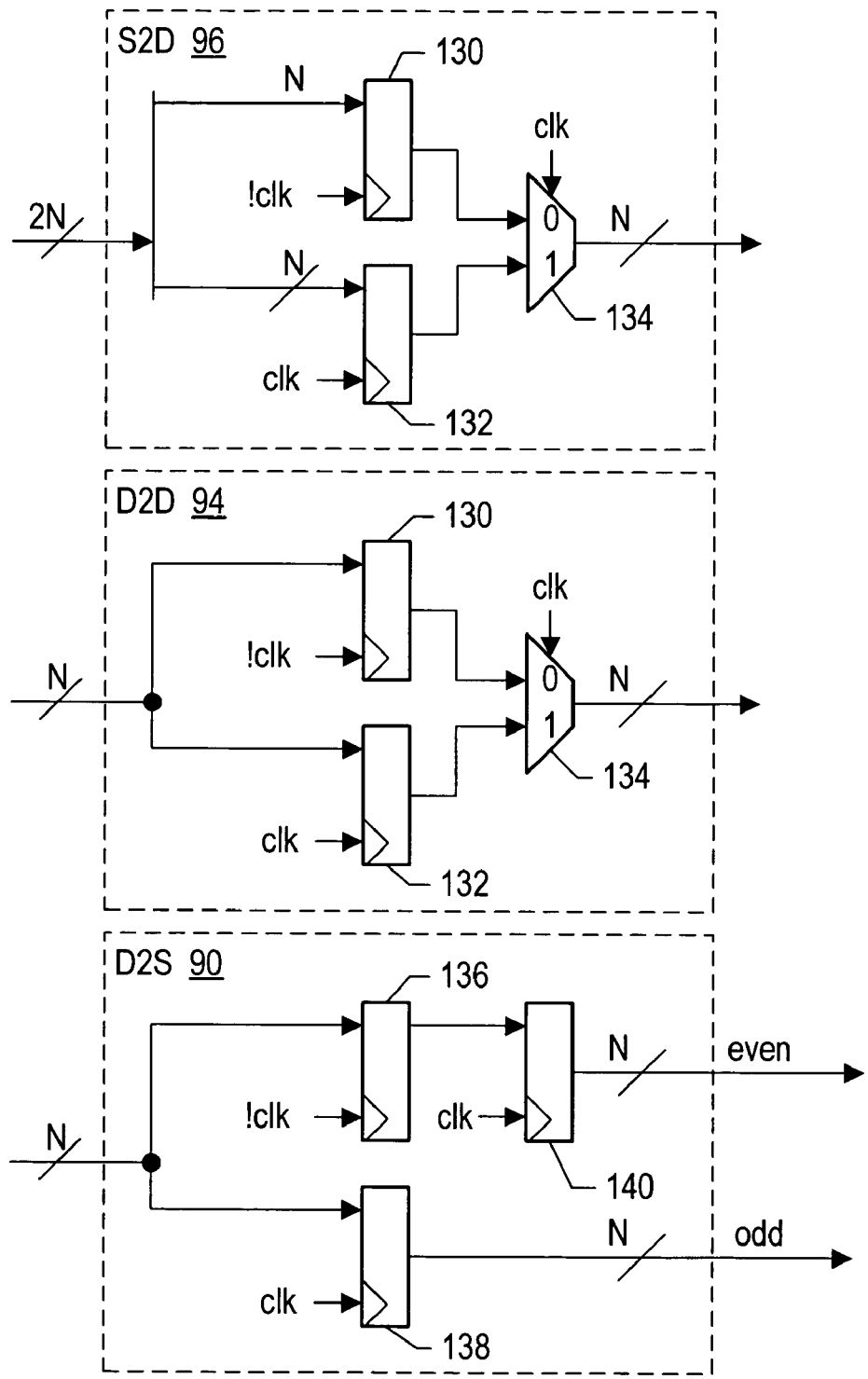
FIG. 8 is a block diagram illustrating one embodiment of data rate change circuits shown in FIGS. 6 and 7.

FIG. 8 is a block diagram of one embodiment of an S2D circuit 96, a D2D circuit 94, and a D2S circuit 90. The D2S circuit 90 may be used as each of the D2S circuits 90A-90C shown in FIGS. 6 and 7. The S2D circuit 96 may be used as each of the S2D circuits 96A-96C shown in FIGS. 6 and 7. The clock clk shown in FIG. 8 may be the memory clock used to clock the memory devices in the channel memories 24A-24D (or may be a clock synchronous to or phase locked to the memory clock).

The S2D circuit 96 takes a 2N bit input of SDR data and outputs N bit DDR data. The 2N bit input is divided into two N-bit halves. One half is passed through a flop 130 that captures data on the falling edge of the clock clk (!clk in FIG. 8), and the other half is passed through a flop 132 that captures data on the rising edge of the clock clk (clk in FIG. 8). A mux 134 selects data alternately from the flops 130 and 132 during the high and low phases of the clock clk.

The D2D circuit 94 may use the same circuit elements as the S2D circuit 96, except that an N bit input is supplied as the input to both flops 130 and 132. Thus, the D2D circuit 94 may provide a register stage for DDR data, outputting the input DDR data with a one half clock cycle delay.

The D2S circuit 90 takes an N bit DDR input and outputs 2N bit SDR data. The N bit input is supplied to two flops 136 and 138. The flop 136 captures data on the falling edge of the clock clk, and the flop 138 captures data on the rising edge of the clock elk. The output of the flop 136 is input to a flop 140, which captures data on the rising edge of the clock elk. In this manner, both the even and odd data outputs from the D2S circuit 90 are synchronized to the rising edge of the clock elk.

It is noted that the D2S circuits 90A and 90B are not shown as having even and odd outputs. However, the outputs of the D2S circuits 90A and 90B are twice the width of the inputs to the circuits 90A and 90B. The even and odd outputs of the D2S circuits 90A and 90B, concatenated, may be the double width output of the D2S circuits 90A and 90B shown in FIG. 6.

Figure 9:
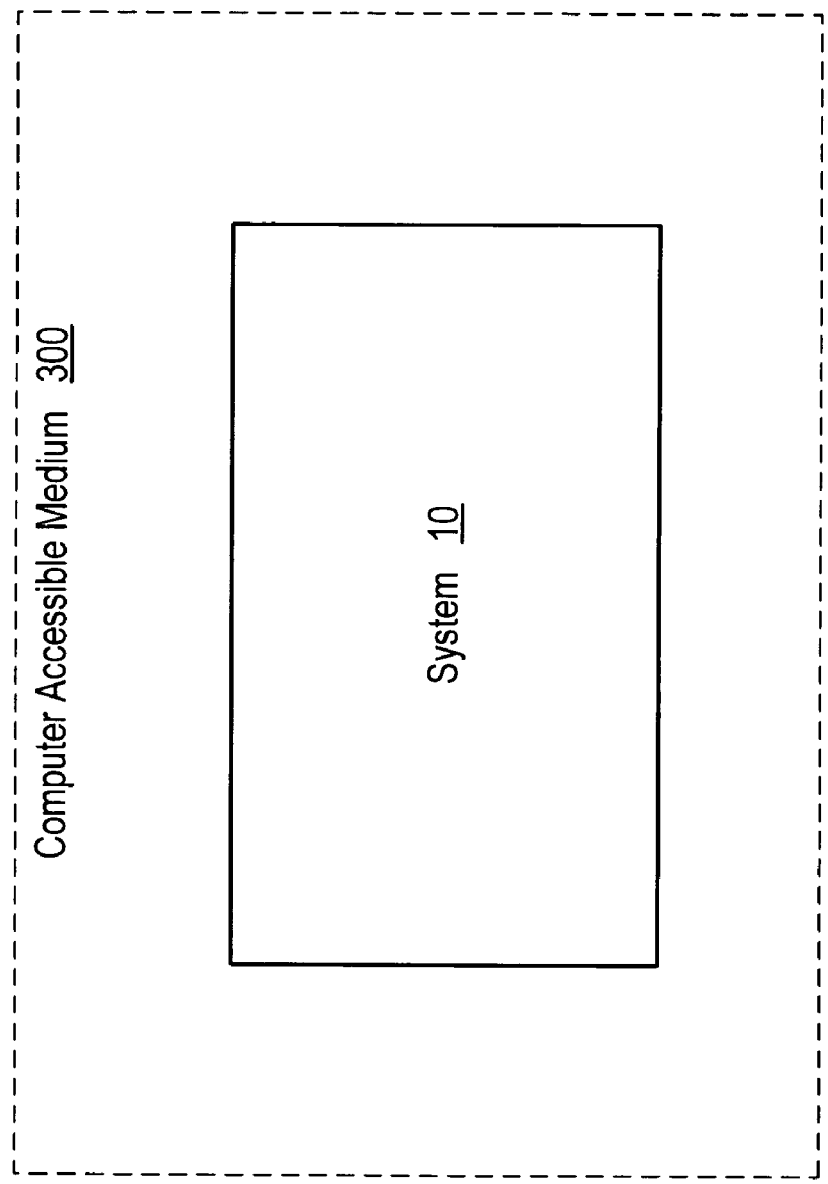
FIG. 9 is a block diagram of one embodiment of a computer accessible medium.

Turning next to FIG. 9, a block diagram of a computer accessible medium 300 including one or more data structures representative of the circuitry included in the system 10 is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired. In yet another alternative, the data structures may comprise the output of a schematic program, or netlist(s) or data set(s) derived therefrom.

While computer accessible medium 300 includes a representation of the system 10, other embodiments may include a representation of any portion of the system 10 (e.g. processors 12A-12N, memory controller 14 (or portions thereof), L2 cache 36, interconnect 22, memory bridge 32 (or portions thereof), remote line directory 34, switch 18, packet manager 16, interface circuits 20A-20C, etc.).

Numerous variations and modifications will become apparent to those skilled in the art once the above disclosure is fully appreciated. It is intended that the following claims be interpreted to embrace all such variations and modifications.

What is claimed is:

1. A memory controller comprising:
   a plurality of channel control circuits, wherein each of the plurality of channel control circuits is coupled to a respective one of a plurality of channels, and wherein the plurality of channels, during use, are coupled to a memory system;
   a decode circuit coupled to receive an indication of whether or not the plurality of channels are ganged or not ganged, the decode circuit also coupled to receive a transaction on an interconnect and decode a command from the transaction to be sent to the channel control circuits to perform a memory access to the memory system based on the indication, and the decode circuit to determine which of the plurality of channels is to be used based on the indication;
   a channel configuration register coupled to the decode circuit and the plurality of channel control circuits, wherein the channel configuration register is programmable to store the indication and data is transferred to or from the memory system based on the command and responsive to the indication; and
   a data normalizer circuit coupled to the plurality of channel control circuits and to a data portion of the plurality of channels, wherein the data normalizer circuit is configured to route read data from the plurality of channels to a first channel control circuit responsive to the indication indicating that the plurality of channels are ganged, and wherein the data normalizer is configured to route read data from the plurality of channels to a respective one of the plurality of channel control circuits responsive to the indication indicating that the channels are not ganged.

2. The memory controller as recited in claim 1 wherein the memory system comprises multiple data rate memory, and wherein the data normalizer circuit is configured to convert the multiple data rate read data to single data rate read data responsive to the indication indicating that the plurality of channels are not ganged.

3. The memory controller as recited in claim 2 wherein the memory data normalizer is configured to supply multiple data rate read data to the first channel control circuit responsive to the indication indicating that the plurality of channels are ganged.

4. The memory controller as recited in claim 3 wherein the first channel control circuit comprises a data path circuit coupled to receive the multiple data rate read data, and wherein the data path circuit is configured to convert the multiple data rate read data to single data rate read data.

5. The memory controller as recited in claim 1 wherein the data normalizer circuit is configured to route write data from the first channel control circuit to each of the plurality of channels responsive to the indication indicating that the plurality of channels are ganged, and wherein the data normalizer is configured to route write data from each of the plurality of channel control circuits to a respective one of the plurality of channels responsive to the indication indicating that the channels are not ganged.

6. The memory controller as recited in claim 5 wherein the data normalizer circuit is configured to convert single data rate write data to multiple data rate write data.

7. The memory controller as recited in claim 1 wherein, if the plurality of channels are ganged, the data transfer on the plurality of channels are to a same memory device.

8. The memory controller as recited in claim 7 wherein, if the plurality of channels are not ganged, each of the plurality of channels is coupled to a separate memory device.

9. A system comprising:
one or more processors; and
a memory controller coupled to receive memory transactions from the processors, wherein the memory controller is configured to process a command in response to each memory transaction, and wherein the memory controller is coupled to a first plurality of channels, and wherein the first plurality of channels, during use, are coupled to a memory system, and wherein the memory controller is configured to transfer data for a first command on each of the first plurality of channels responsive to a first indication indicating that the plurality of channels are ganged, but to transfer data on a selected one of the plurality of channels responsive to the indication indicating that the plurality of channels are not ganged, the memory controller further coupled to a second plurality of channels and wherein the second plurality of channels, during use, are coupled to the memory system, in which the memory controller is configured to transfer data on the second plurality of channels responsive to a second indication indicative of whether or not the second plurality of channels are ganged, the second indication being independent of the first indication.

10. The system as recited in claim 9 wherein, responsive to the first indication indicating that the first plurality of channels are not ganged, the memory controller is configured to concurrently transfer data for a second command on a different channel of the first plurality of channels from the selected channel.

11. A method comprising:
generating a first indication of whether or not a first plurality of channels from a memory controller to a memory system are ganged;
transferring data for a first command on each of the first plurality of channels responsive to the first indication indicating that the first plurality of channels are ganged; and
transferring data for the first command on a selected one of the first plurality of channels responsive to the first indication indicating that the plurality of channels are not ganged
generating a second indication of whether or not a second plurality of channels from the memory controller to the memory system are ganged, wherein generating the second indication is independent of generating the first indication;
transferring data for a second command on each of the second plurality of channels responsive to the second indication indicating that the second plurality of channels are ganged; and
transferring data for the second command on a selected one of the second plurality of channels responsive to the second indication indicating that the second plurality of channels are not ganged.

12. The method as recited in claim 11 further comprising concurrently transferring data for a second command on a different one of the first plurality of channels from the selected channel responsive to the first indication indicating that the first plurality of channels are not ganged.

* * * * *